United States Patent
Mochizuki et al.

(10) Patent No.: US 7,374,339 B2
(45) Date of Patent: May 20, 2008

(54) SEAL DEVICE FOR A GUIDE DEVICE AND GUIDE DEVICE

(75) Inventors: Hiroaki Mochizuki, Yamanashi (JP); Tetsuhiro Nishide, Tokyo (JP)

(73) Assignee: THK Co., Ltd., Tokyo (JP)

( * ) Notice: Subject to any disclaimer, the term of this patent is extended or adjusted under 35 U.S.C. 154(b) by 393 days.

(21) Appl. No.: 11/053,439

(22) Filed: Feb. 9, 2005

(65) Prior Publication Data

US 2005/0169559 A1 Aug. 4, 2005

Related U.S. Application Data

(62) Division of application No. 10/247,630, filed on Sep. 20, 2002, now Pat. No. 6,877,900.

(30) Foreign Application Priority Data

Sep. 21, 2001 (JP) ............ P2001-288247
Jun. 28, 2002 (JP) ............ P2002-190931

(51) Int. Cl.
*F16C 33/00* (2006.01)
*F16J 15/34* (2006.01)

(52) U.S. Cl. .......... 384/15; 384/43; 277/377; 277/399

(58) Field of Classification Search ........ 384/15, 384/43–45; 277/377, 399, 906; 104/106, 104/119
See application file for complete search history.

(56) References Cited

U.S. PATENT DOCUMENTS

| | | | |
|---|---|---|---|
| 4,844,624 A * | 7/1989 | Teramachi | 384/45 |
| 5,087,130 A | 2/1992 | Tsukada | |
| 5,149,205 A | 9/1992 | Tsukada | |
| 5,308,170 A * | 5/1994 | Yamaguchi et al. | 384/45 |
| RE35,323 E * | 9/1996 | Ohtake | 384/15 |
| 5,634,722 A | 6/1997 | Yuasa et al. | |
| 5,678,927 A | 10/1997 | Yabe et al. | |
| 6,488,411 B2 * | 12/2002 | Michioka et al. | 384/45 |

FOREIGN PATENT DOCUMENTS

| | | |
|---|---|---|
| DE | 44 04 109 | 10/1994 |
| EP | 1 005 953 | 6/2000 |
| EP | 1 059 464 | 12/2000 |
| JP | 3-57560 A | 3/1991 |
| JP | 4-25028 A | 1/1992 |
| JP | 09-042284 A | 2/1997 |
| JP | 2001-099152 A | 4/2001 |

* cited by examiner

*Primary Examiner*—Thomas R. Hannon
*Assistant Examiner*—Justin Krause
(74) *Attorney, Agent, or Firm*—Westerman, Hattori, Daniels & Adrian, LLP.

(57) ABSTRACT

A seal device fixed to an end portion of a slider of a guide device includes: a casing; a plurality of seal members; and elastic members, wherein each seal member has a recess portion in which a rail penetrates. An inner circumferential face of the recess portion comes into contact with an outer surface of the rail when the seal member is pushed onto one side of the rail by the elastic members. The plurality of seal members are arranged in the casing in such a manner that when a seal portion of one seal member is pushed by the elastic member and contacted with one side of the rail, a seal portion of the next seal member is pushed by the elastic member and contacted with the other side of the rail.

12 Claims, 12 Drawing Sheets

SEAL DEVICE FOR A GUIDE DEVICE AND GUIDE DEVICE

This application is a divisional of application Ser. No. 10/247,630, filed Sep. 20, 2002 now U.S. Pat. No. 6,877,900.

BACKGROUND OF THE INVENTION

1. Field of the Invention

The present invention relates to a seal device for a guide device used for a moving portion of various machine tools, industrial robots or various common machines. Particularly, the present invention relates to a seal device for a guide device in which a slider striding over a rail is guided along the rail. More particularly, the present invention relates to a seal device which effectively exhibits a sealing function even in a guide device in which the rail width is partially different. The present invention also relates to a guide device in which the seal device is used.

2. Description of the Related Art

Conventionally, there is provided a seal device for a guide device shown in FIGS. 1(a) and 1(b). In the drawings, reference numeral 121 is referred to as an end seal attached to an end portion of the slider 120 arranged striding over the rail 130 and moved along the rail 130. This end seal 121 is composed in such a manner that a rubber member 124 is coated on a plate-shaped core metal 123. The core metal 123 has a recess portion 122 in which the rail 130 penetrates. A seal portion 125, which is called a lip, is formed at the inner circumferential edge of the recess portion 122. Since a forward end portion of the seal portion 125 closely comes into contact with the outer circumferential face of the rail 130 and moves together with the slider 120, foreign objects such as dust does not get into the slider 120. FIG. 1(a) is a front view of the slider 120 and end seal 121, and FIG. 1(b) is a sectional view of the inner circumferential portion of the end seal 121.

In the conventional seal device, the following problem may be encountered. The dimension t (interval between the inner circumferential face of the core metal 123 and the outer circumferential face of the rail 130) of the seal portion 125 of the end seal 121 is 1 to 2 mm. In case where the width of the rail 130 is different as shown in FIG. 2, for example, a transport device described in Japanese Unexamined Patent Publication No. 2001-99152 in which the slider 120 moves on the rail 130, the rail width of the curved portion 130B of the rail 130 is smaller than that of the straight portion 130A, it is impossible for the elastic extension and contraction of the seal portion 125 to absorb a change in the width of the rail 130. That is, it is impossible for the elastic extension and contraction of the seal portion 125 to absorb a reduction of the width in the small width portion. Therefore, the forward end portion of the seal portion 125 is separated from the outer circumferential face of the rail 130, which results in a defective sealing function.

In order to solve the above problem, Japanese Patent Publication No. 2939846 discloses a seal device as shown in FIG. 3. This seal device 110 includes a pair of end face plates 102, 103 made of metal arranged at the end portions of the slider 100 in the moving direction. The end face plates 102, 103 have an inside shape formed into the same profile as that of the outer face of the rail 101. A small gap is formed between the inside of the end face plates 102, 103 and the rail 101. The seal device further includes a support member 104 interposed between the end plates 102, 103; two side seal members 105, 106 and one upper seal member 107 made of bearing metal and arranged in a cut-out portion provided inside the support member 104. The two side seal members 105, 106 and one upper seal member 107 are formed in shapes that correspond to the profile of the outer face of the rail 101. The two side seal members 105, 106 and one upper seal member 107 are restricted to move by the pair of end face plates 102, 103. The seal device further includes compression springs 108 for elastically pushing the seal members 105, 106, 107 onto the outer face of the rail 101.

However, even in the seal device 110 composed as described above, the following problems may be encountered. In case where the slider 100 is guided along the rail 101 in which a straight portion and curved portion are continuously connected with each other, a gap is caused between the rail 101 and the side seal members 105, 106 by an inner wheel difference of the curved portion, which deteriorates the sealing function of the seal member. Further, since the seal member is divided into three pieces of the side seal members 105, 106 and the upper seal member 107 so that the seal members do not come into contact with each other, a gap is caused at each of the intersections (opposing faces) of the divided seal members. Further, in case where the inner wheel difference is caused in the curved portion of the rail 101, it is impossible to absorb the inner wheel difference. Further, this device is disadvantageous in that the number of parts is large and the structure becomes complicated. For example, when such a structure is adopted that the divided seal members come into contact with each other, a gap is formed by the abrasion caused between the divided seal members.

In the conventional-guide device, the end seal 121 is arranged at the end of the slider 120, and the seal device 110 is arranged at the end of the moving member (slider) 100 as described above. However, no seal devices are arranged in the side portions of the slider 120 and the moving member (slider) 100, that is, no seal devices are arranged in the portions opposed to the side of the rail 130. Therefore, problems may be encountered in which dust gets into the slider from the side portion. Therefore, it is impossible to apply the conventional guide device, for example, to a wood working machine used in a dusty place.

SUMMARY OF THE INVENTION

The present invention has been accomplished to solve the above problems. It is an object of the present invention to provide a seal device for a guide device and a guide device which enable a simple structure and exhibit not only a sealing function of the slider end portion but also a sealing function of the slider side portion even in case where the rail width is changed and the shape of the rail is changed from a straight line to a curved line.

According to a first aspect of the present invention, there is provided a seal device for a guide device which is fixed to an end portion of a slider of the guide device so as to prevent foreign objects such as dust from getting into the seal device, the slider being arranged striding over a straight and/or curved rail and guided along the rail, the seal device comprising: a casing; a plurality of plate-shaped seal members accommodated in the casing; and an elastic member for pushing the seal members onto the rail, wherein each seal member has a recess portion in which the rail penetrates, an inner circumferential face of the recess portion includes a seal portion which comes into contact with an outer surface of the rail, and wherein the plurality of seal members are arranged in the casing in such a manner that the seal members are pushed by the elastic member, the seal portion of one seal member comes into contact with one side of the rail, and the seal portion of the next seal member comes into contact with the other side of the rail.

As described above, when the seal portion formed in the recess portion of one seal member in a plurality of seal members provided in the casing is pushed by the elastic member and contacted with one side of the guide rail, the seal portion formed in the next seal member is pushed onto the other side of the guide rail, that is, the plurality of seal members are arranged in the casing while the phase of the seal portion formed in the recess portion of one seal member and the phase of the seal portion formed in the recess portion of the other seal member are alternately changed from each other. Due to the above structure, sealing is performed in such a manner that the seal portions of a plurality of seal members (at least two seal members) slide on the circumferential face of the rail on which the slider moves. Therefore, a perfect sealing function can be provided. Especially when the rail width is locally different, for example even when the width of a curved portion is smaller than that of a straight portion, a difference in the width can be absorbed when the seal member is moved while being pushed by the elastic member. Therefore, the seal portion can be always contacted with the outer circumferential face of the guide rail, and the sealing function is not impaired.

According to a second aspect of the present invention, the elastic members are integrally formed on the outer periphery of the seal members.

When the elastic member is integrally formed in the outer periphery of the seal member, the number of parts composing the seal device can be decreased, and the assembling work can be easily performed.

According to a third aspect of the present invention, an isolation plate is arranged between the seal members.

When the isolation plate is arranged between the seal members as described above, each seal member can be smoothly moved regardless of the rail width by the function of the elastic member without interfering with the other seal members, and the seal portion comes into contact with the outer circumferential face of the guide rail. Therefore, the sealing function is effectively performed.

According to a fourth aspect of the present invention, there is provided a seal device for a guide device which is fixed to a side portion of a slider of the guide device so as to prevent foreign objects such as dust from getting into the seal device, the slider being arranged striding over a straight and/or curved rail and guided along the rail, the seal device comprising: a casing; a plurality of plate-shaped seal members accommodated in the casing; and an elastic member for pushing the seal members onto the rail, wherein a side of at least one seal member slidably coming into contact with the side of the rail is formed into a convex or concave shape of a predetermined radius of curvature, a side of at least one seal member slidably coming into contact with the side of the rail is formed into a straight shape, and wherein the seal members are pushed by the elastic member and at least one portion of the side of each seal member comes into contact with the side of the rail.

As described above, the side of at least one seal member slidably coming into contact with the side of the rail is formed into a convex or concave shape of a predetermined radius of curvature, and the side of at least one seal member slidably coming into contact with the side of the rail is formed into the straight shape. Therefore, in the straight portion of the rail, the straight side of the seal member closely comes into contact with the side of the rail, and in the curved portion of the seal member, the side of the seal member, which is formed into a convex or concave of a predetermined radius of curvature, closely comes into contact with the side of the rail. Therefore, even if the rail profile is changed from a straight shape to a curved shape, no foreign objects get into the slider from the side portion.

According to a fifth aspect of the invention, there is provided a seal device for a guide device which is fixed to a side portion of a slider of the guide device so as to prevent foreign objects such as dust from getting into the seal device, the slider being arranged striding over a straight and/or curved rail and guided along the rail, the seal device comprising: a casing; a plurality of plate-shaped seal members accommodated in the casing; and an elastic member for pushing the seal members onto the rail, wherein a side of at least one seal member slidably coming into contact with the side of the rail is formed into a convex shape of a predetermined radius of curvature, a side of at least one seal member slidably coming into contact with the side of the rail is formed into a concave shape of a predetermined radius of curvature, and a side of at least one seal member slidably coming into contact with the side of the rail is formed into a straight shape, and wherein the seal members are pushed by the elastic member and at least one portion of the side of each seal member comes into contact with the side of the rail.

As described above, the side of at least one seal member slidably coming into contact with the side of the rail is formed into a convex shape of a predetermined radius of curvature, and the side of at least one seal member slidably coming into contact with the side of the rail is formed into a concave shape of a predetermined radius of curvature, and further the side of at least one seal member slidably coming into contact with the side of the rail is formed into a straight-line-shape. Due to the above structure, in the straight rail portion, the straight side of the seal member closely comes into contact with the rail side. In the curved rail portion, the convex side of the seal member of a predetermined radius of curvature or the concave side of the seal member closely comes into contact with the rail side. In the portion where the rail is curved in the other direction, the concave side of the seal member of a predetermined radius of curvature or the convex side of the seal member closely comes into contact with the rail side. Therefore, even if the rail is curved from a straight shape to a curved shape which is curved to either the right or the left, no foreign objects get into the slider from the side portion of the slider.

According to a sixth aspect of the present invention, the elastic members of a guide device according to the fourth or fifth aspect are integrally formed on the outer periphery of the seal members.

When the elastic member is integrally formed in the outer periphery of the seal member, the number of parts composing the seal device can be decreased, and the assembling work can be easily performed.

According to a seventh aspect of the present invention, an isolation plate is arranged between the seal members of a guide device according to one of the fourth to sixth aspects.

When the isolation plate is arranged between the seal members as described above, each seal member can be smoothly moved regardless of the rail width by the function of the elastic member without interfering with the other seal members, and the seal portion comes into contact with the outer circumferential face of the guide rail. Therefore, the sealing function is effectively performed.

According to a eighth aspect of the present invention, there is provided a guide device comprising: a straight and/or curved rail; and a slider arranged striding over the rail, the slider having seal devices arranged at both end portions and both side portions respectively for preventing foreign objects from getting into the slider, wherein the seal device attached to both end portions of the slider is the seal device according to one of the first to third aspects, and the seal device attached to both side portions is the seal device according to one of the fourth to seventh aspects.

As described above, when the seal device attached to both end portions of the slider is the seal device according to one of the first to third aspects, and the seal device attached to both side portions is the seal device according to one of the fourth to seventh aspects, both end portions and both side portions of the slider are sealed. Accordingly, no foreign objects get into the slider.

DETAILED DESCRIPTION OF THE PREFERRED EMBODIMENTS

Figure 4:
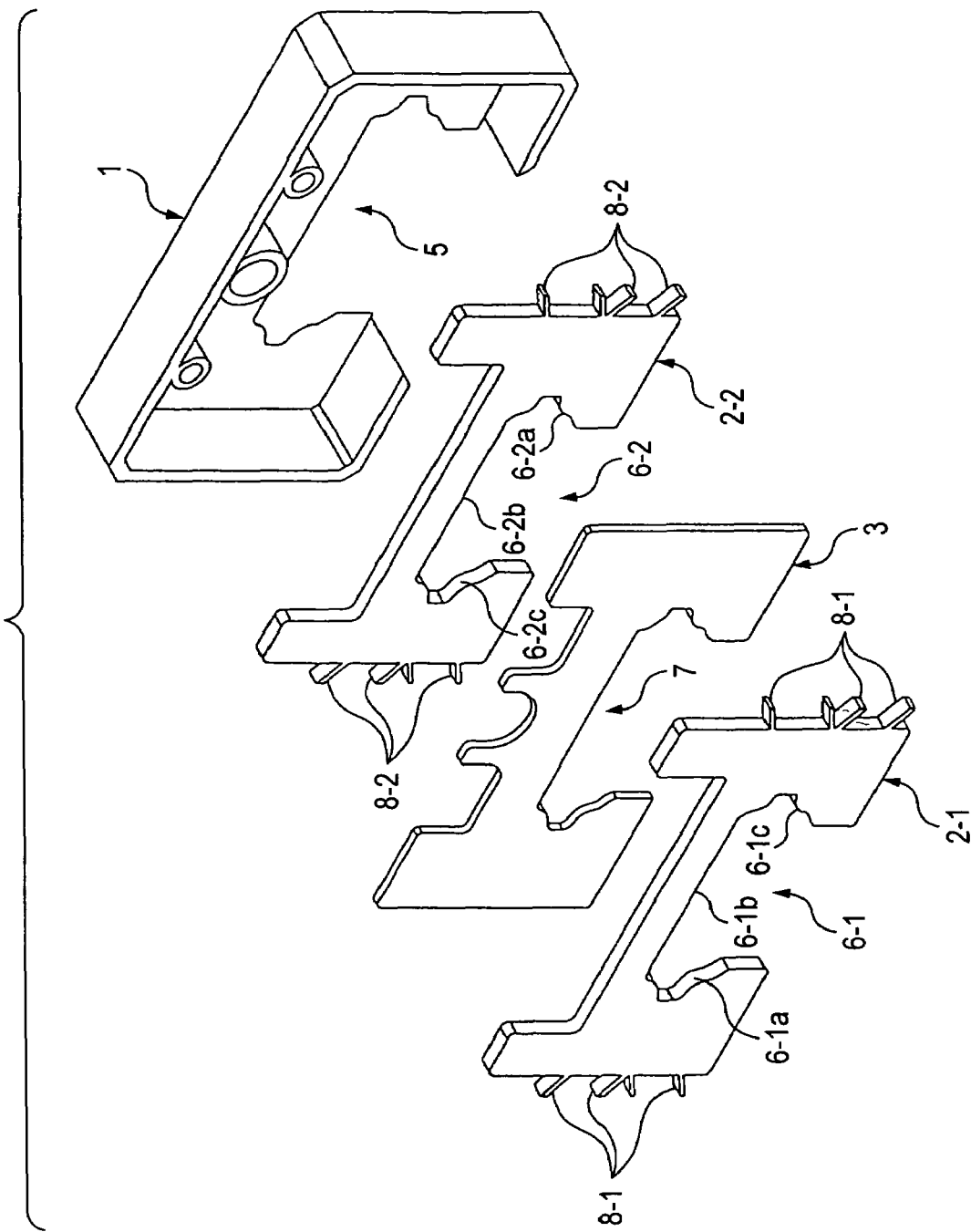
FIG. 4 is an exploded perspective view showing a seal device of a guide device of the present invention.

Referring to the drawings, embodiments of the present invention will be described below. FIG. 4 is an exploded perspective view showing an arrangement of a seal device of a guide device of the present invention. As shown in the drawing, this seal device includes: a casing 1; a plurality of seal members 2-1, 2-2 accommodated in the casing 1 (In the drawing, two seal members are shown.); and an isolation plate 3 interposed between the seal members 2-1, 2-2. In the casing 1, there is formed a recess portion 5 in which the rail (shown in FIG. 6) penetrates. In the seal members 2-1, 2-2, there are respectively formed recess portions 6-1, 6-2 in which the rail 4 penetrates. In the isolation plate 3, there is formed a recess 7 in which the rail 4 penetrates.

Figure 5:
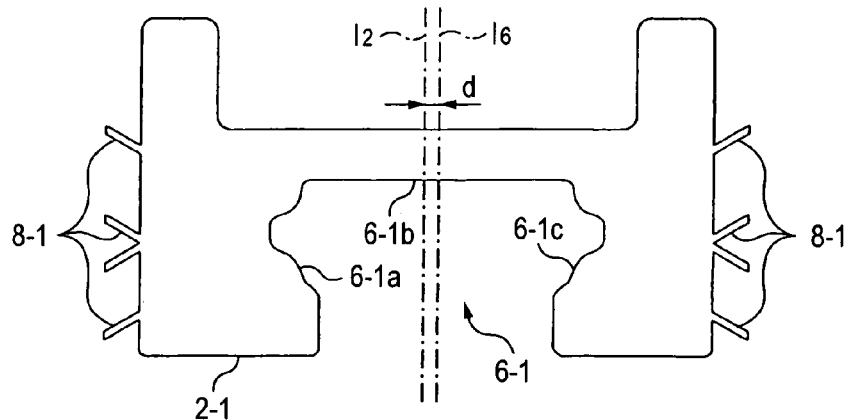
FIG. 5 is a front view showing a seal member of the seal device of the guide device.

At both side portions of each seal member 2-1, 2-2, there are integrally provided elastic members 8-1, 8-1. As shown in FIG. 5, the center line $l_6$ of the recess portion 6-1 of the seal member 2-1 in the width direction is shifted from the center line $l_2$ of the seal member 2-1 itself in the width direction by the distance d. The inner circumferential face 6-1a on one side and the inner circumferential face 6-1b on the upper side are formed into a shape closely coming into contact with the outer circumferential face of the rail 4. Although not shown in the drawing, the structure of the seal member 2-2 is the same as that of the seal member 2-1, and the inner circumferential face 6-2a on one side and the inner circumferential face 6-2b on the upper side are formed into a shape closely coming into contact with the outer circumferential face of the rail 4.

Figure 6:
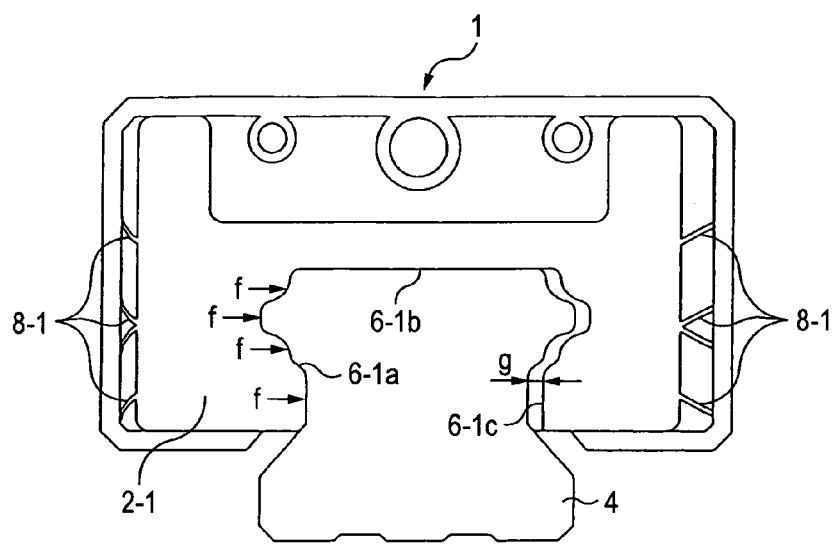
FIG. 6 is a front view showing the seal device of the guide device.

FIG. 6 is a view showing a positional relation of the seal member 2-1 with the rail 4 in the case where the seal member 2-1 is accommodated in the casing 1 and the rail 4 is inserted into its recess portion 6-1. As shown in FIG. 5, the center line $l_6$ of the recess portion 6-1 (not shown in FIG. 6) of the seal member 2-1 in the width direction is shifted from the center line $l_2$ of the seal member 2-1 itself in the width direction by the distance d. Therefore, when the seal member 2-1 is accommodated in the casing 1 and the rail 4 is inserted into its recess portion 6-1, the elastic member 8-1 on one side (on the left in the drawing) contracts and pushes the seal member 2-1 as shown by the arrow f, however, the elastic member 8-1 on the other side (on the right in the drawing) does not contract but extends. Due to the foregoing, the inner circumferential face 6-1a on one side of the recess portion 6-1 composing the seal portion closely comes into contact with the outer circumferential face on one side of the rail 4, however, a gap g is formed between the inner circumferential face 6-1c on the opposite side of the recess portion 6-1 and the outer circumferential face on the opposite side of the rail 4.

The seal member 2-2 is arranged in the casing 1 interposing the isolation plate 3 while the phase is shifted (inverted by 180°) as follows. On the contrary to the seal member 2-1, the inner circumferential face 6-2a on one side of the recess portion 6-2 composing the seal portion closely comes into contact with the outer circumferential face on one side on the opposite side of the rail 4, so that the gap g can be formed between the inner circumferential face 6-2c on one side of the recess portion 6-2 and the outer circumferential face on the opposite side of the rail 4.

Due to the above structure, the inner circumferential faces 6-1a, 6-2a on one side composing the seal portion of the seal members 2-1, 2-2, which are arranged on both sides of the isolation plate 3 in the casing, are pushed by the elastic members 8-1, 8-2 and respectively contacted with the opposed outer circumferential face of the rail 4. Under the above condition, the inner circumferential faces 6-1a, 6-2a on one side composing the seal portion of the seal members 2-1, 2-2 are moved on the rail 4 together with the slider. Therefore, foreign objects such as dust are removed from the outer circumferential face of the rail 4 by the seal portion of the seal members 2-1, 2-2. Accordingly, no foreign objects get into the slider. The inner circumferential faces 6-1a, 6-2a on side of the seal members 2-1, 2-2 are contacted with the outer circumferential face of the rail 4 on the opposed side when they are pushed by the elastic members 8-1, 8-2. Therefore, even if the width of the rail 4 differs within the expansion and contraction range of the elastic members 8-1, 8-2, the width difference can be absorbed in this expansion and contraction range. Accordingly, no gaps are formed between the seal portion and the outer circumferential face of the rail 4. Therefore, the sealing function is not impaired.

Figure 1:
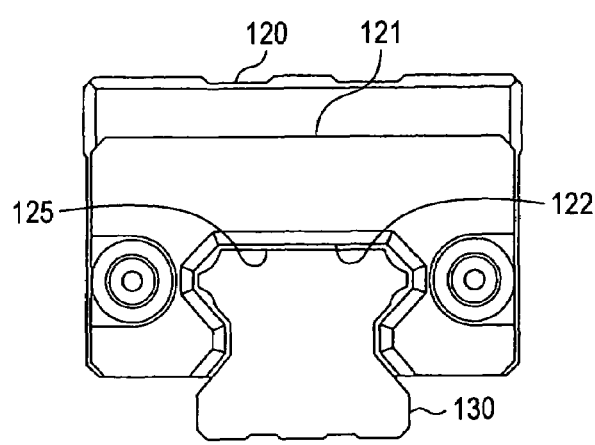
FIG. 1(a) is a front view showing a conventional seal device and FIG. 1(b) is a sectional view of an inner circumferential portion of an end seal.
Figure 1:
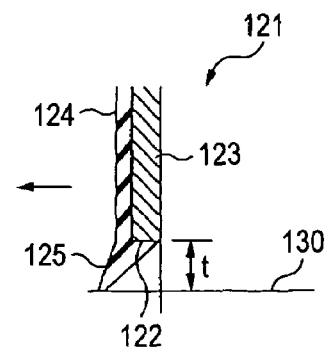
Figure 2:
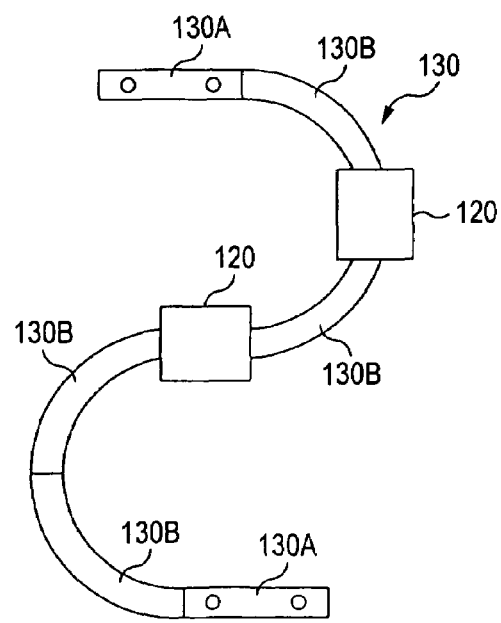
FIG. 2 is a plan view showing a conventional guide device using a rail in which a straight portion and curved portion are combined with each other.
Figure 3:
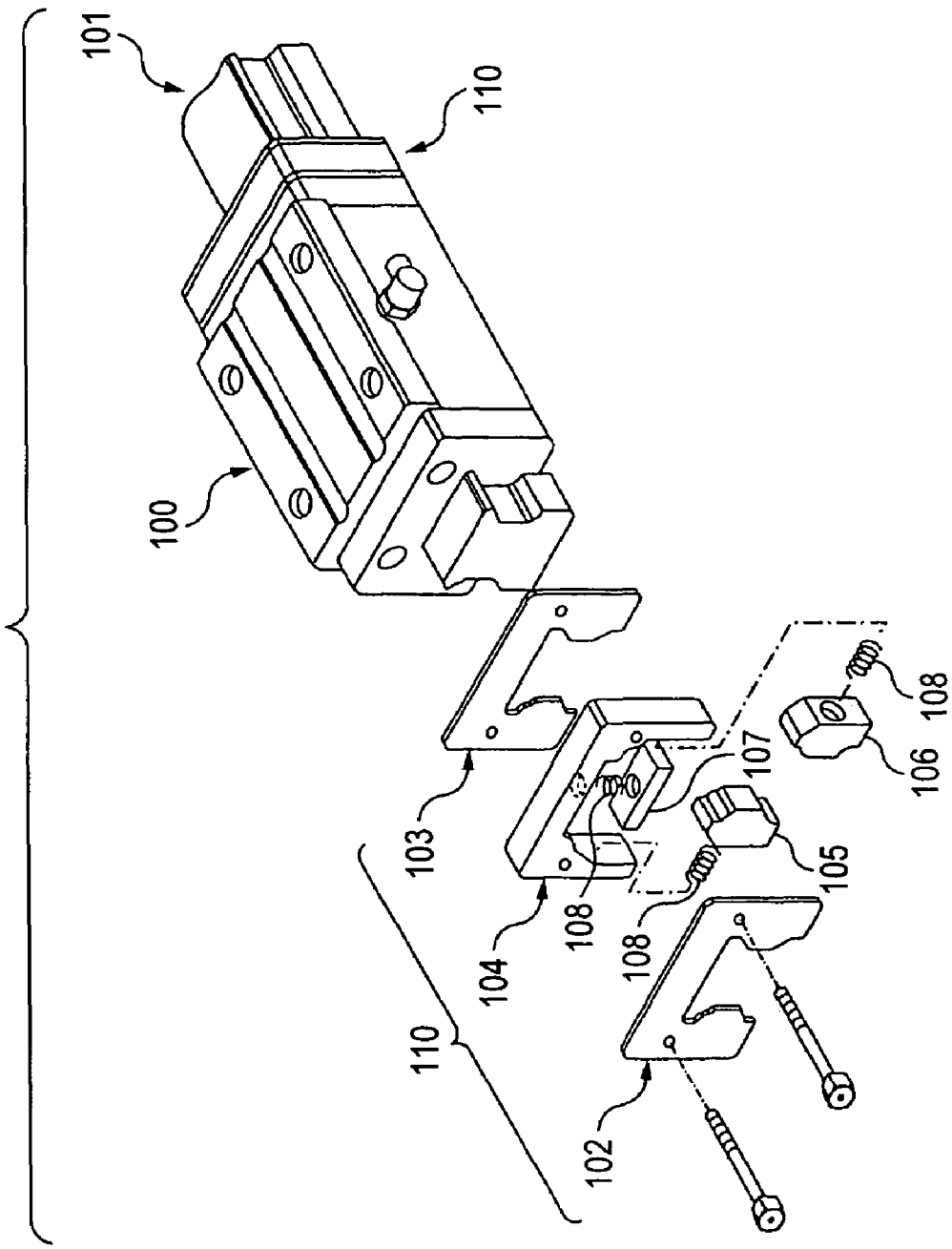
FIG. 3 is an exploded perspective view showing the conventional guide device.
Figure 7:
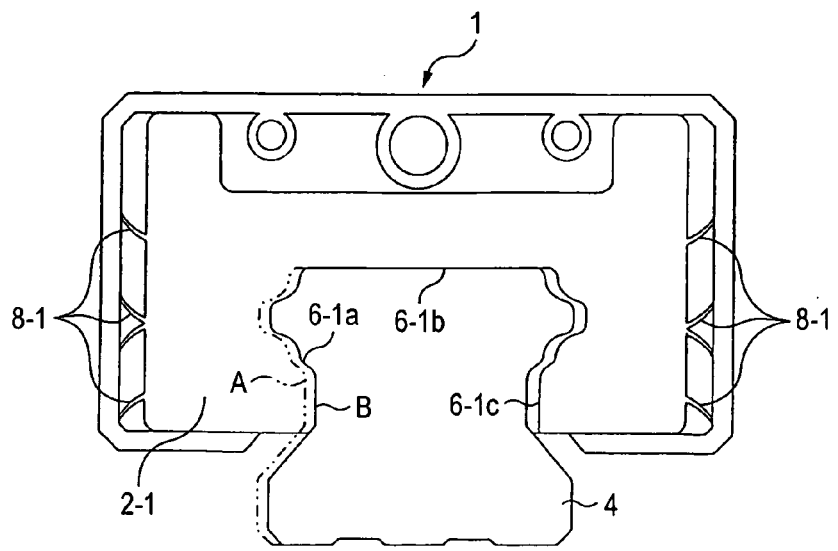
FIG. 7 is a front view showing an operation of the seal device of the guide device.

FIG. 7 is a view to explain a sealing function in the case where the seal device of the present invention is applied to a guide device in which the rail width of a curved portion is smaller than the rail width of a straight portion like the transport device (shown in FIG. 2) described in Japanese Unexamined Patent Publication No. 2001-99152. In the drawing, two-dotted chain line A expresses an outer circumference of the rail 4 in the straight portion, and solid line B expresses an outer circumference of the rail 4 in the curved portion. As shown in the drawing, since the seal member 2-1 is pushed onto the rail side by the elastic member 8-1, the inner circumferential face 6-1a on one side composing the seal portion always closely comes into contact with and slides on the outer circumferential face in either the straight portion (portion shown by two-dotted chain line A) in which the width of the rail 4 is large or the curved portion (portion shown by solid line B) in which the width of the rail 4 is small. Although not shown in the drawing, the seal member 2-2 is also pushed by the elastic member 8-2, and the inner circumferential face 6-2a on one side always closely comes into contact with and slides on the outer circumferential face of the rail 4 in either the straight portion or the curved portion of the rail 4.

Due to the foregoing, the inner circumferential faces 6-1a, 6-2a on one side of the seal members 2-1, 2-2 and the upper side inner circumferential faces 6-1b, 6-2b always slidably come into contact with both the outer side faces and the upper face of the rail 4 irrespective of the width of the rail. Therefore, a sufficiently high sealing performance can be exhibited. In the above example, the width of the curved portion of the rail 4 is different from that of the straight portion. The seal device of the present invention is capable of exhibiting a sufficiently high sealing performance even in the case where the width is different within the curved portion and in the case where the width is different within the straight portion.

The seal members 2-1, 2-2 are made of elastic material such as rubber or resin formed into a felt-shape, however, materials to compose the seal members 2-1, 2-2 are not limited to the above specific examples. As far as the material is easily conformed to and seldom seized to and easily fitted to the rail 4, any material such as resin or metal, for example, white metal used for a bearing metal may be used for the seal members 2-1, 2-2. In the above example, the cross sections of the inner circumferential faces 6-1c, 6-2c on one side of the seal members 2-1, 2-2 which do not compose the seal portion are made to be similar to the cross section of the outer circumferential face of the rail 4, however, the cross sections of the inner circumferential faces 6-1c, 6-2c are not limited to the above specific example.

Figure 8:
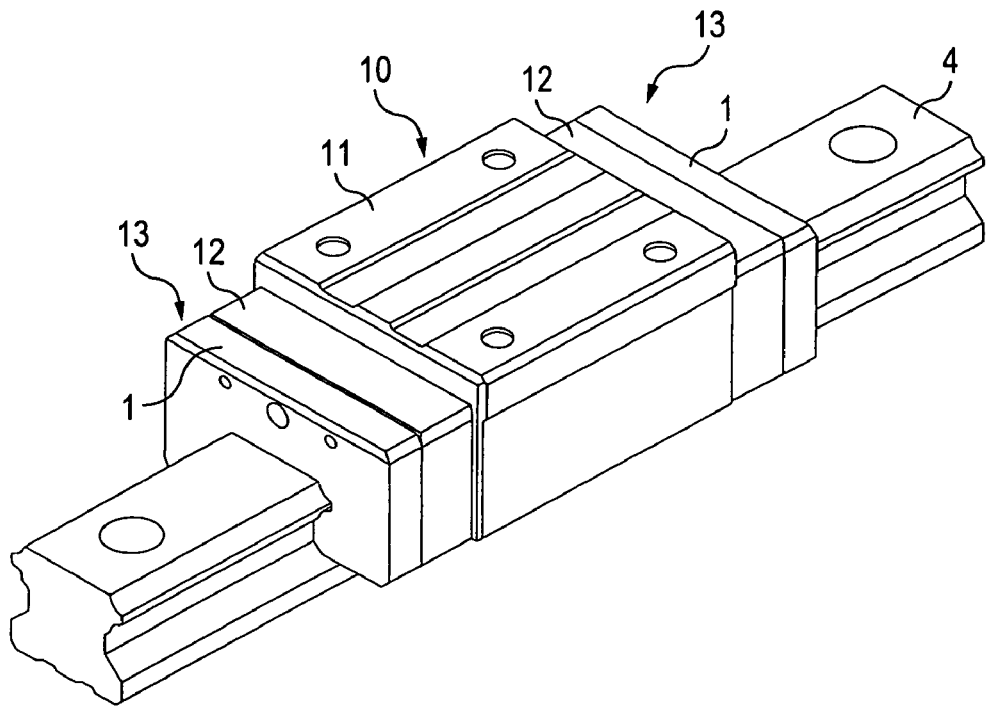
FIG. 8 is a perspective view showing the guide device.

FIG. 8 is a view showing an appearance of the guide device to which the seal device of the present invention is applied. In the view, reference numeral 10 is a slider which is arranged striding over the rail. The slider 10 comprises a block 11, the detail of which will be described later, and end plates 12. The seal devices 13 of the present invention are arranged outside the end plates 12 which are attached to both ends of the slider 10. The slider 10 is moved in the longitudinal direction of the rail 4. When the slider 10 is moved, the inner circumferential faces 6-1a, 6-2a on one side of the seal members 2-1, 2-2 (shown in FIGS. 4 and 6) and the inner circumferential faces 6-1b, 6-2b on the upper side of the seal members composing the seal device 13 closely-come into contact with and slide on both the side faces and the upper face of the rail 4. Due to the foregoing, foreign objects such as dust can be prevented from getting into the slider 10 from the surface of the rail 4.

Figure 9:
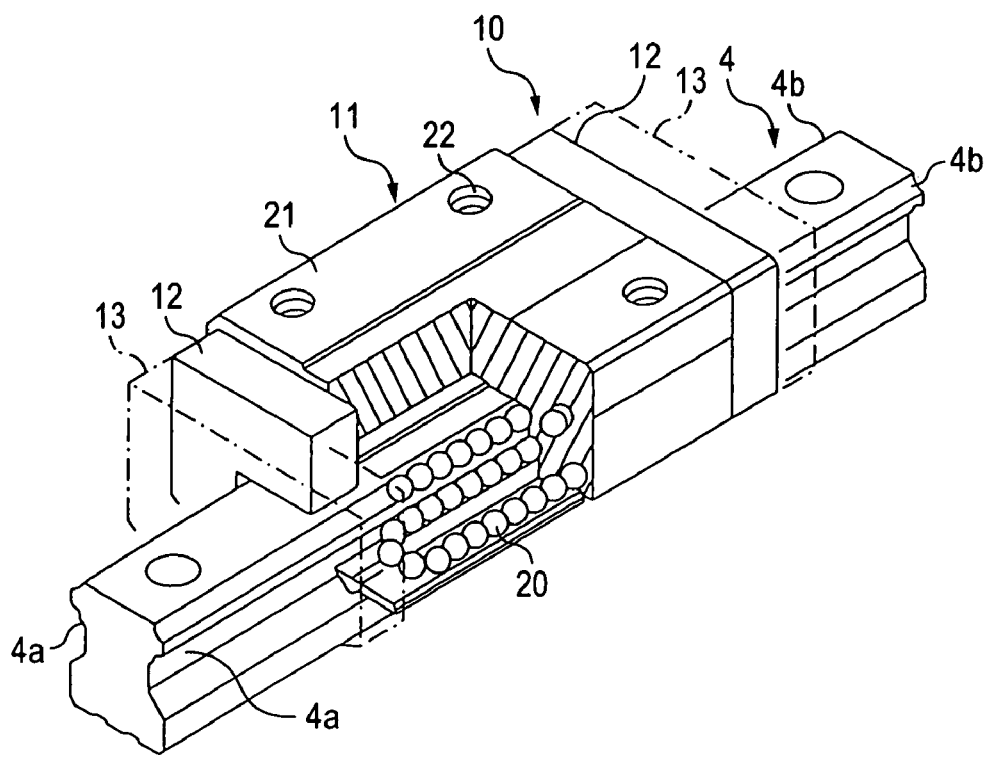
FIG. 9 is a partially cutaway perspective view showing the guide device.
Figure 10:
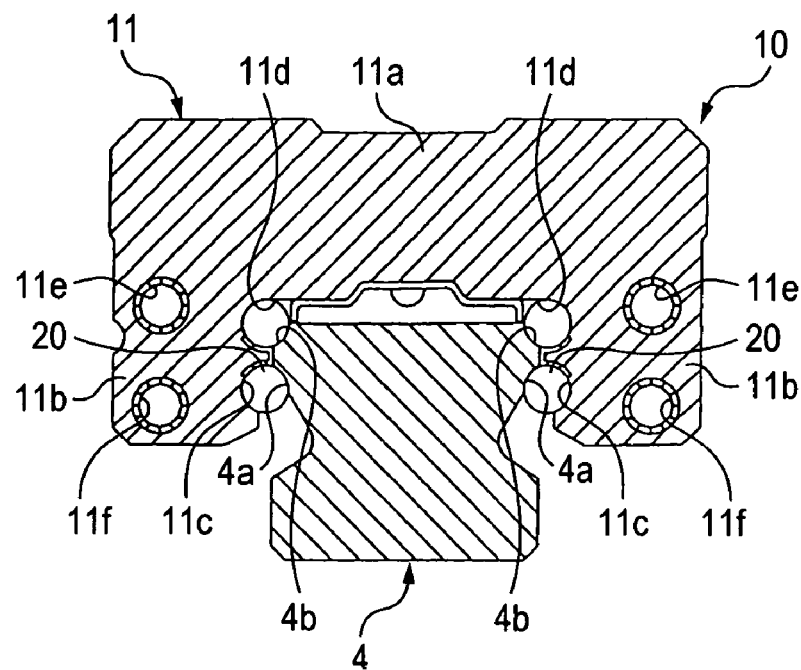
FIG. 10 is a sectional view showing the guide device.

FIGS. 9 and 10 are a partially cutaway perspective view and lateral sectional view showing a composition of the guide device from which the seal device 13 is removed. The cross section of the rail 4 is formed into a substantial rectangle. Four ball running grooves 4a, 4b, in which the balls 20 are running, are formed in the longitudinal direction. These ball running grooves 4a, 4b are formed on both side faces and at both edge portions on the upper face of the rail 4. The ball running grooves 4a located on both side faces are formed downward by the angle of about 30° with respect to the lateral direction on the surface of FIG. 9. On the other hand, the ball running grooves 4b on the upper face are formed upward in the vertical direction.

The slider 10 includes: a block 11 having an attaching face 21, onto which the movable body such as a table is attached, and tap holes 22 in which bolts for fixing the movable body are screwed; and a pair of end plates 12, 12 attached (fixed) to both end portions of the block 11. When the end plates 12, 12 are attached, an infinite circulating path for the balls 20 is composed in the slider 10.

The block 11 includes: a horizontal portion 11a on which the attaching face 21 is formed; and a pair of skirt portions 11b, 11b which are hanging from the horizontal portion 11a. The cross section of the block 11 is substantially formed into a saddle. On the lower face side of the horizontal portion 11a and on the inside of each skirt portion 11b, four straight load running grooves 11c, 11d, which are opposed to the ball running grooves 4a, 4b of the rail 4, are formed. In the horizontal portion 11a and each skirt portion 11b, the ball returning holes 11e, 11f respectively corresponding to the load running grooves 11c, 11d are formed. By the U-shaped direction converting paths formed on the end plates 12, 12, the load running grooves 11c, 11d and the corresponding ball returning holes 11e, 11f are connected with each other, so that the infinite circulating path of the balls can be formed.

Due to the foregoing, the balls 20 are running as follows. The balls 20, which bear a load between the ball running grooves 4a, 4b of the rail 4 and the load running grooves 11c, 11d of the block 11, run in the load running grooves 11c, 11d according to the movement of the slider 10 and are released from the load. Then the balls 20 get into the direction converting path formed on one end plate 12 and run in the opposite direction to the running direction of the load running grooves 11c, 11d while no load is being given to the balls 20. In this way, the balls 20 run in the ball returning holes 11e, 11f formed in the block 11. After the balls 20 have run in the ball returning holes 11e, 11f, they get between the rail 4 and the block 11 again via the direction converting path formed on the other end plate 12. Then, while the balls 20 are bearing a load, they run in the load running grooves 11c, 11d.

The above-described guide device is an example of the guide device into which the seal device of the present invention is incorporated. Therefore, the guide device of the present invention is not limited to the above specific example. After all, as far as the guide device is composed in such a manner that the slider is arranged striding over a straight and/or curved rail and guided along the rail and the seal device of the present invention is fixed to the end portion of the slider, it is possible to exhibit a sealing function by which foreign objects such as dust can be prevented from getting into the slider.

In the seal device of the above structure, two seal members 2-1, 2-2 are arranged while the isolation plate 3 is being interposed between them. However, the number of the seal members is not limited to two, that is, not less than three seal members may be arranged. The isolation plate 3 is not necessarily required. In the case where each seal member can be smoothly moved even when the seal members 2-1, 2-2 are contacted with each other, the isolation plate 3 may be omitted. In the above example, the elastic members 8-1, 8-2 are respectively arranged on both side portions of the seal members 2-1, 2-2 integrally with the seal members 2-1, 2-2. However, the elastic members 8-1, 8-2 are not necessarily arranged integrally with the seal members 2-1, 2-2. As far as each seal member 2-1, 2-2 can be individually pushed toward the rail 4, the elastic members 8-1, 8-2 may be composed separately from the seal members 2-1, 2-2.

Figure 11:
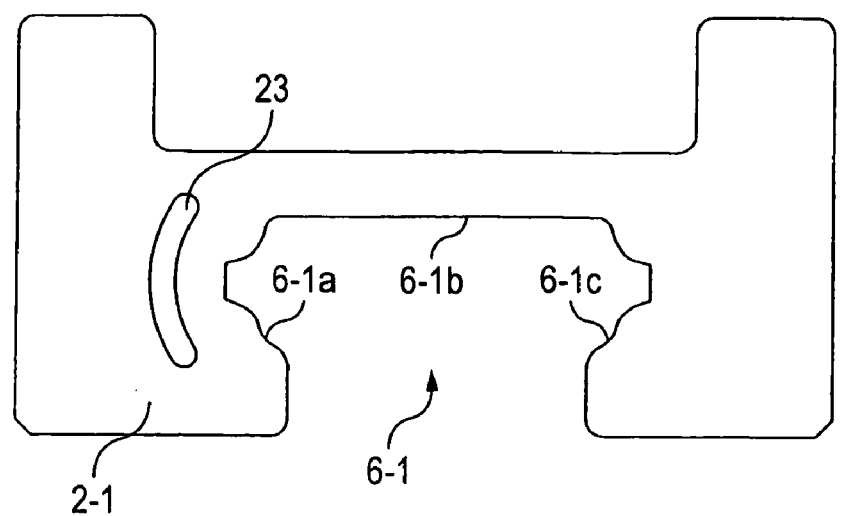
FIG. 11 is a front view showing a seal member of a seal device of a second embodiment of the present invention.

The elastic members are not necessarily formed separately from the seal members 2-1, 2-2. The following structure may be adopted. When the seal members 2-1, 2-2 are made of elastic material, the inner circumferential face 6-1a, 6-2a on one side can be always contacted with the outer circumferential face of the rail by the elastic extension and contraction caused between the one side of the seal members 2-1, 2-2 and the inner circumferential faces 6-1a, 6-2a on one side even if the rail width is changed. Further, the following structure may be adopted. For example, as shown in FIG. 11, a predetermined shape of hole 23 is formed in the seal member 2-1. Since the shape of the hole 23 can be deformed, the inner circumferential face 6-1a on one side composing the seal portion of the recess portion 6-1 can be always contacted with the outer circumferential face of the rail even if the rail width is changed. Although not shown in the drawing, the situations are the same in the case of the seal member 2-2.

Figure 12:
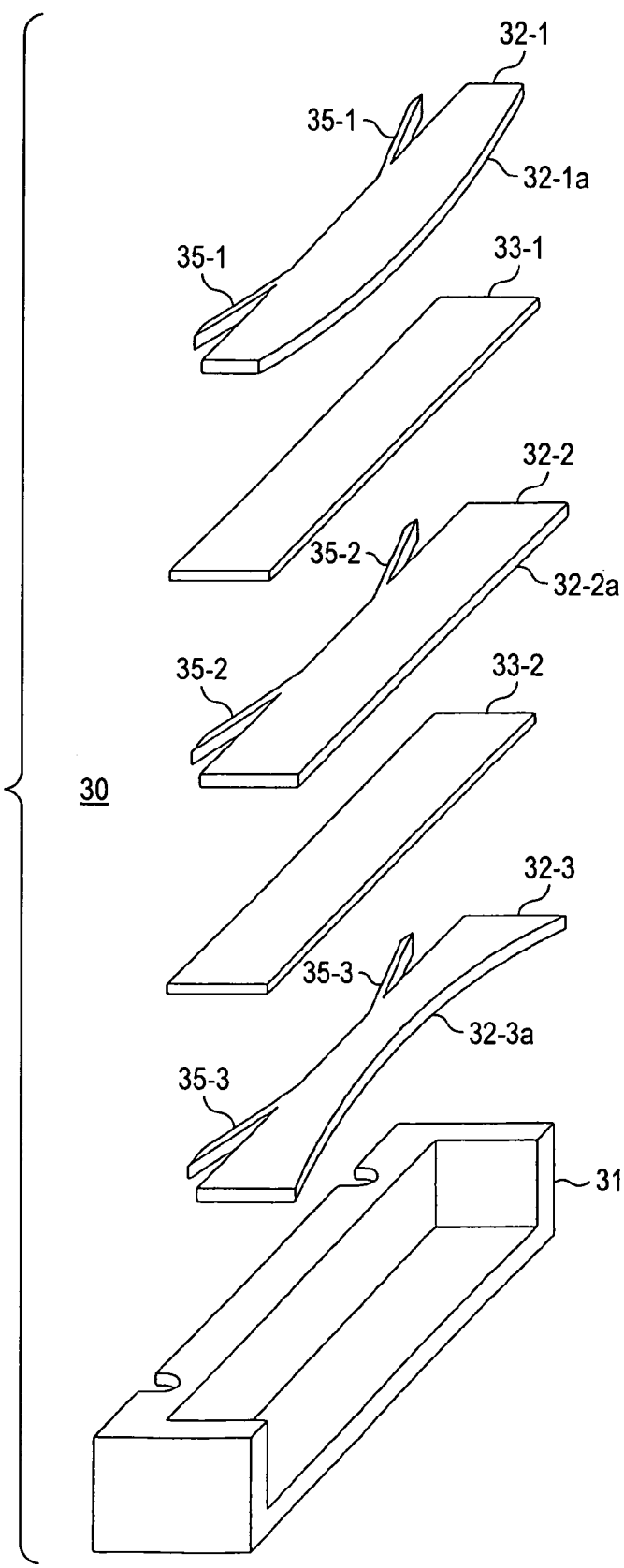
FIG. 12 is an exploded perspective view showing a seal device of a third embodiment of the present invention.

FIG. 12 is an exploded perspective view showing an example of the arrangement of the seal device of the guide device of the present invention. As shown in the drawing, the seal device 30 includes: a casing 31; a plurality of (three in the case shown in the drawing) plate-shaped seal members 32-1, 32-2, 32-3; and two isolation plates 33-1, 33-2 interposed between the seal member 32-1 and the seal member 32-2 and between the seal member 32-2 and the seal member 32-3. The seal members 32-1, 32-2, 32-3 and the isolation plates 33-1, 33-2 are superposed to each other and accommodated in the casing 31. As shown in FIGS. 13(a) and 13(b), the seal members 32-1, 32-2, 32-3 and the isolation plates 33-1, 33-2 are attached (fixed) to both side bottom portions of the block 11 of the slider 10 by screws 34. The seal members 32-1, 32-2, 32-3 are pushed onto the sides of the rail 4 by the elastic members, and the sides are slidably contacted with the side faces of the rail 4 as described later. FIG. 13(a) is a lateral sectional view of the rail 4 and slider 10 of the guide device, and FIG. 13(b) is an enlarged sectional view of the neighborhood portion of the seal device 30.

The side 32-1a of the seal member 32-1 slidably coming into contact with the side of the rail 4 is formed into a convex (an arcuate shape) of a predetermined radius of curvature, the side 32-2a of the seal member 32-2 slidably coming into contact with the side of the rail 4 is formed into a straight shape, and further the side 32-3a of the seal member 32-3 slidably coming into contact with the side of the rail 4 is formed into a concave (an arcuate shape) of a predetermined radius of curvature. On the sides of the seal members 32-1, 32-2, 32-3 arranged on the side opposite to the rail 4, the elastic members 35-1, 35-1, 35-2, 35-2, 35-3, 35-3 are respectively integrally arranged. When the thus composed seal device 30 is attached to both side bottom portions of the block 11 of the slider 10, the seal members 32-1, 32-2, 32-3 are pushed by the elastic members 35-1, 35-1, 35-2, 35-2, 35-3, 35-3.

Figure 14:
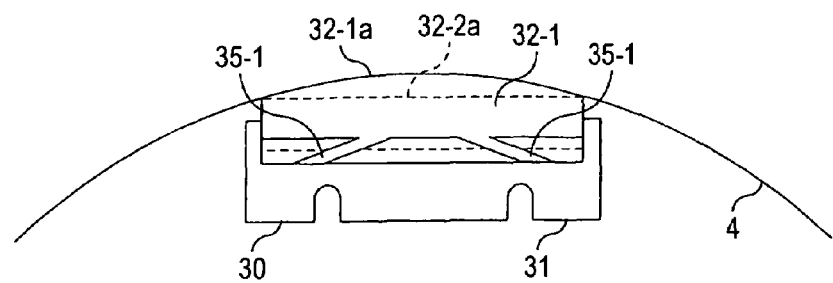
FIGS. 14(a) to 14(c) are plan views showing an operation of the seal device.
Figure 14:
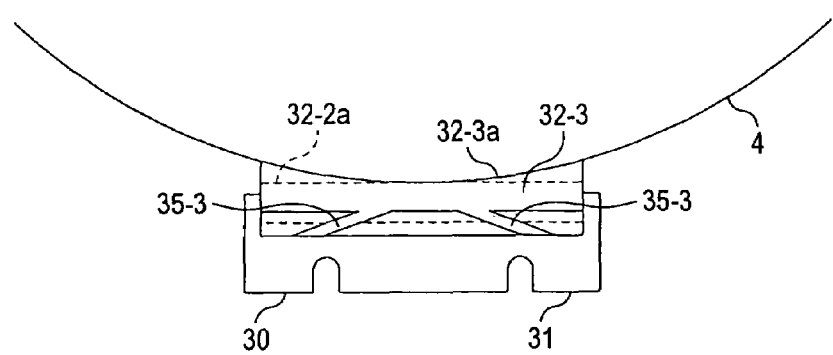
Figure 14:
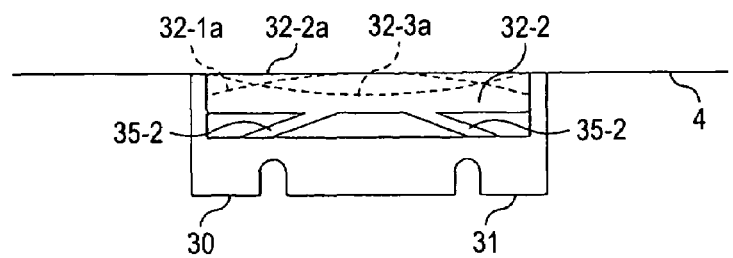

Since the side 32-1a of the seal member 32-1 is formed into a convex (an arcuate shape) of a predetermined radius of curvature, the side 32-2a of the seal member 32-2 is formed into a straight shape, and further the side 32-3a of the seal member 32-3 is formed into a concave (an arcuate shape) of a predetermined radius of curvature, in a portion where the rail 4 is curved convex by a predetermined radius of curvature as shown in FIG. 14(a), the side 32-1a of the seal member 32-1 closely comes into contact with the side of the rail 4 so as compose the seal portion. In a portion where the rail 4 is curved concave by a predetermined radius of curvature as shown in FIG. 14(b), the side 32-3a of the seal member 32-3 closely comes into contact with the side of the rail 4 so as compose the seal portion. In a portion where the rail 4 is straight as shown in FIG. 14(c), the side 32-2a of the seal member 32-2 closely comes into contact with the side of the rail 4 so as compose the seal portion.

Figure 13:
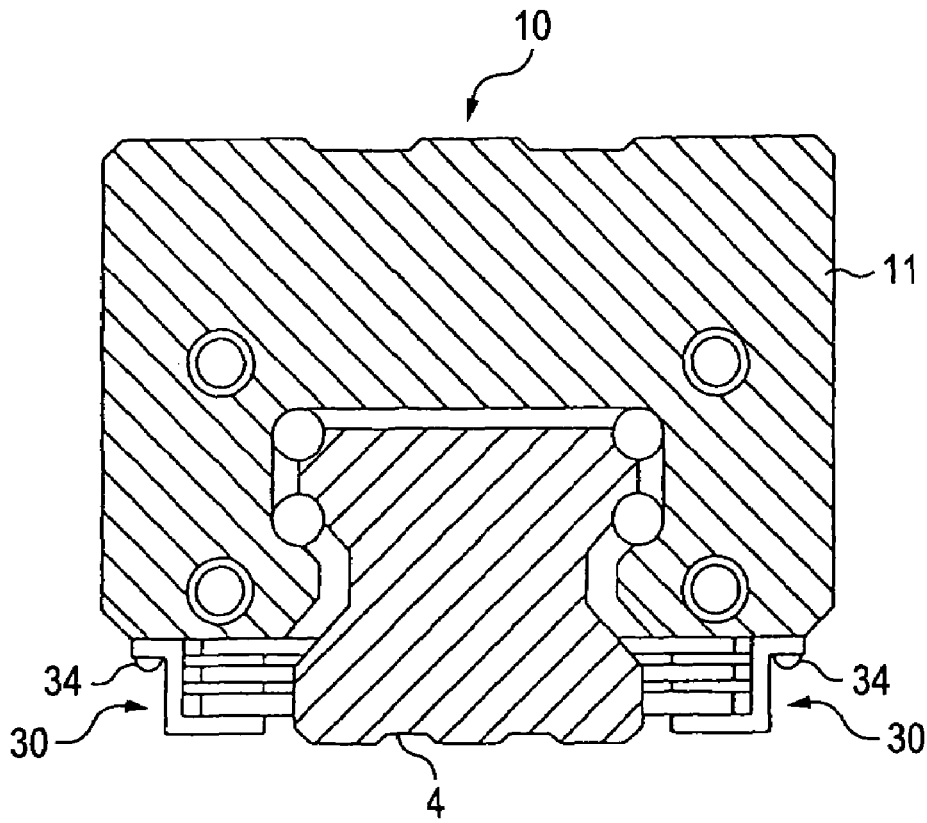
FIGS. 13(a) and 13(b) are sectional views showing the seal device.
Figure 13:
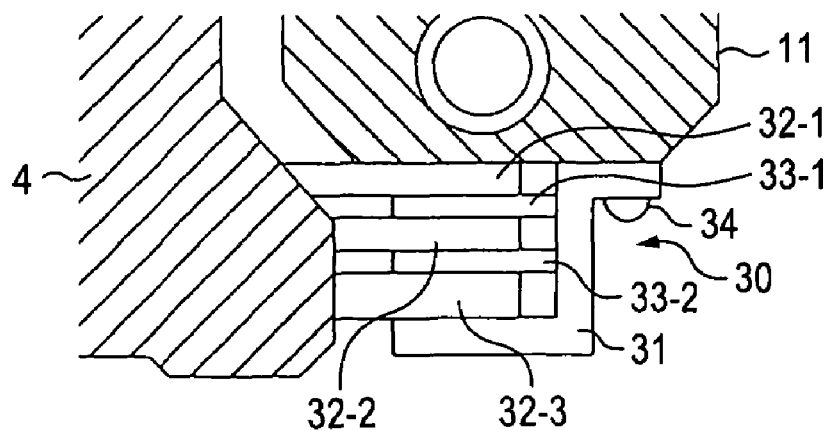
Figure 15:
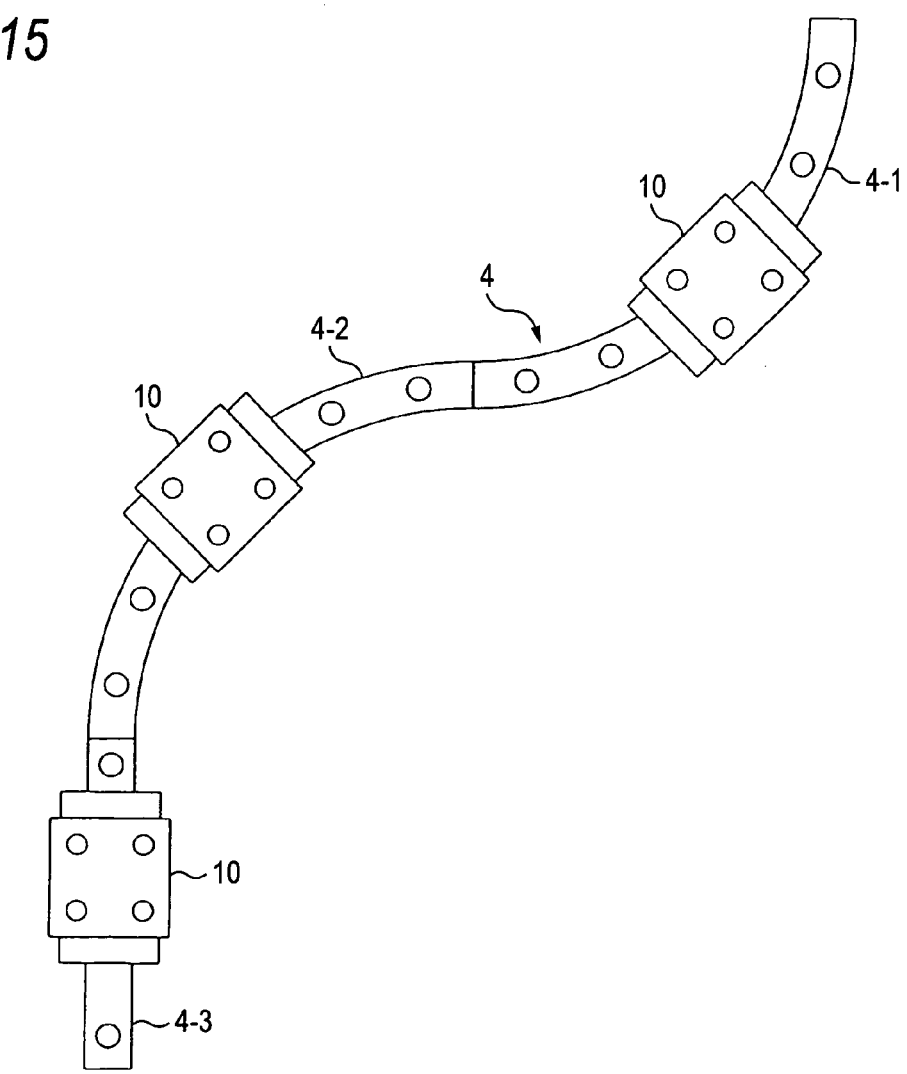
FIG. 15 is a plan view showing the guide device.

In the case where the rail 4 snakes as shown in FIG. 15, the rail 4 is composed of curved portions 4-1, 4-2 and a straight portion 4-3, wherein the curved portions 4-1, 4-2 are respectively formed into arcs, the radiuses of curvature of which are predetermined. Therefore, the convex (arcuate) side 32-1a of the seal member 32-1 and the concave (arcuate) side 32-3a of the seal member 32-3 are previously manufactured according to the radiuses of curvature of these curved portions 4-1, 4-2. Due to the foregoing, when the seal device 30 in which the seal members 32-1, 32-2, 32-3 are superposed as shown in FIG. 12 is attached to both side bottom portions of the block 11 of the slider 10 as shown in FIG. 13, if the slider 10 is moved on the snaking rail 4, either of the sides 32-1a, 32-2a, 32-3a of the seal members 32-1, 32-2, 32-3 closely comes into contact with the side of the rail 4, so that the seal portion can be formed.

The seal members 32-1, 32-2, 32-3 can be made of the same material as that of the seal members 2-1, 2-2. The isolation plates 33-1, 33-2 can be made of the same material as that of the above isolation plate 3.

In the seal device 30 of the above structure, three seal members 32-1, 32-2, 32-3 are arranged while the isolation plates 33-1, 33-2 are being interposed between them, however, the number of the seal members is not limited to three. That is, not less than three seal members may be arranged. The isolation plates are not necessarily required. In the case where each seal member can be smoothly moved even when the seal members 32-1, 32-2, 32-3 are contacted with each other, the isolation plates may be omitted. In the above example, the elastic members 35-1, 35-2, 35-3 are respectively arranged on side portions of the seal members 32-1, 32-2, 32-3 integrally with the seal members 32-1, 32-2, 32-3. However, the elastic members 35-1, 35-2, 35-3 are not necessarily arranged integrally with the seal members 32-1, 32-2, 32-3. As far as each seal member 32-1, 32-2, 32-3 can be individually pushed toward the rail 4, the elastic members 35-1, 35-2, 35-3 may be composed separately from the seal members 32-1, 32-2, 32-3.

Figure 16:
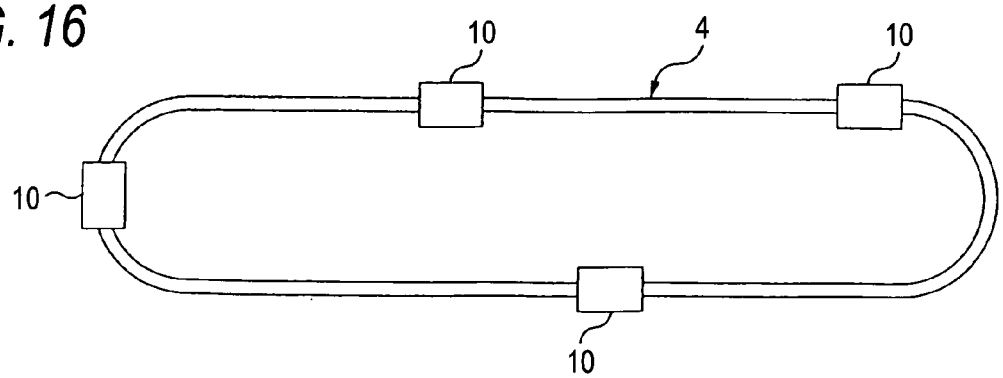
FIG. 16 is a plan view showing the guide device.
Figure 17:
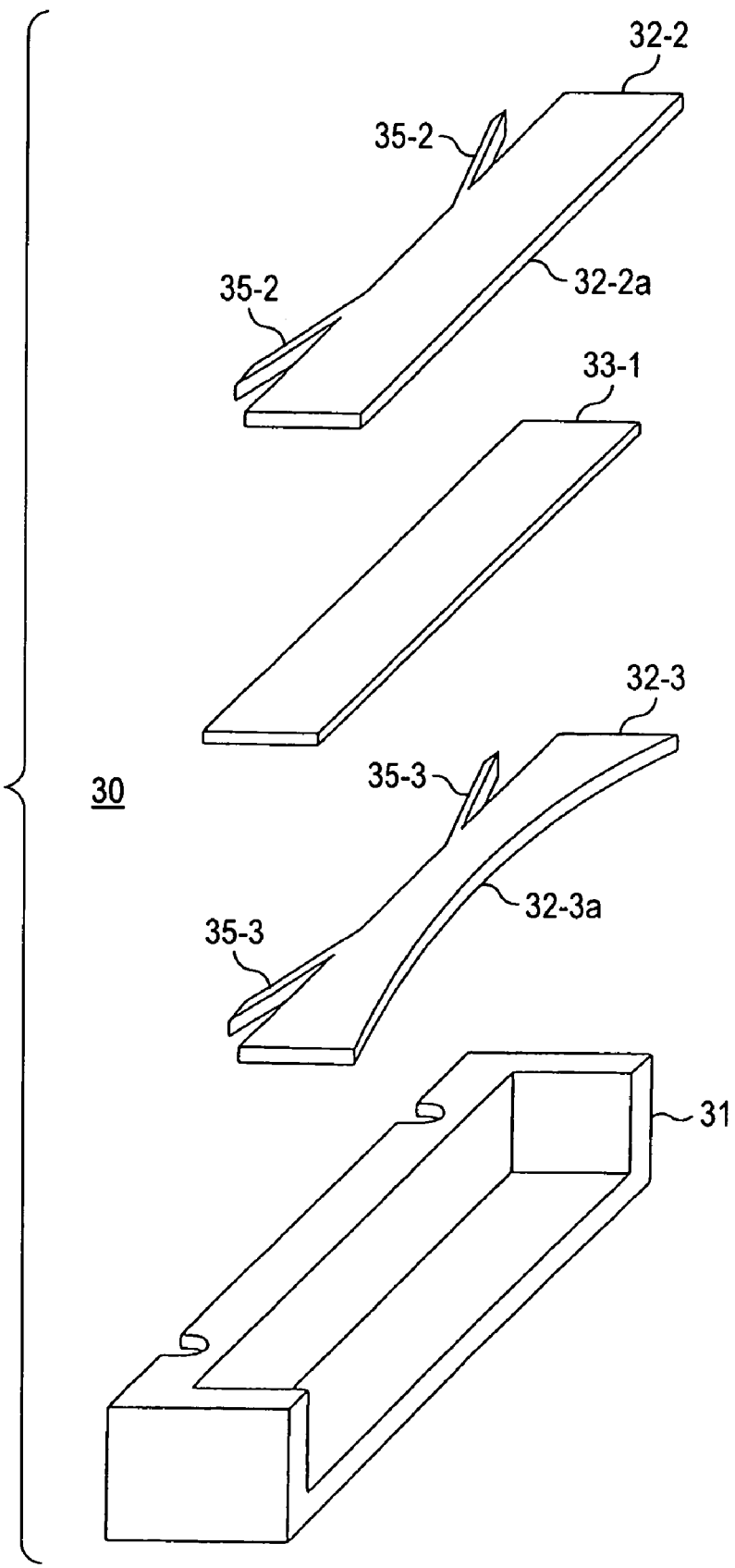
FIG. 17 is an exploded perspective view showing a seal device of a fourth embodiment of the present invention.
Figure 18:
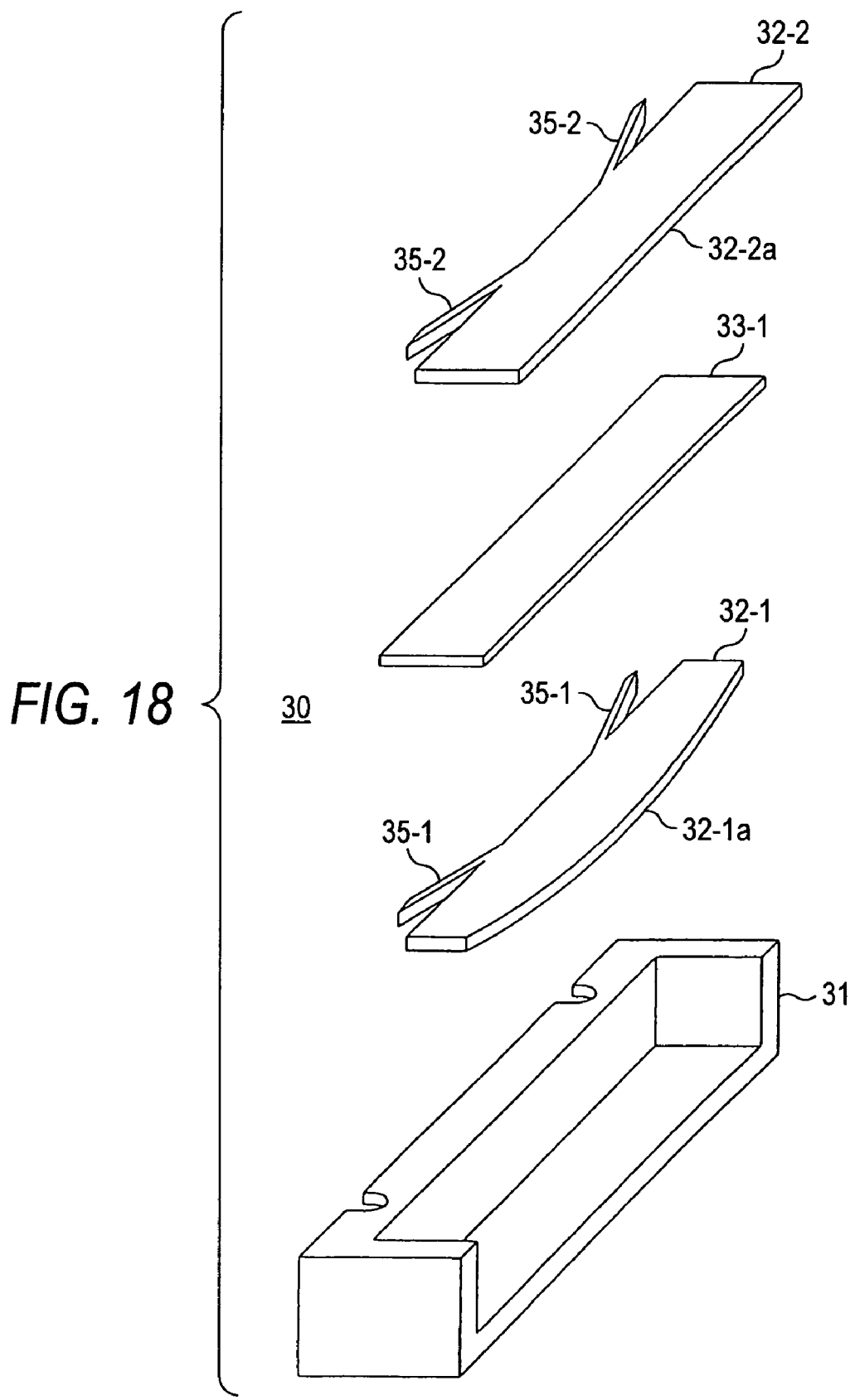
FIG. 18 is an exploded perspective view showing a seal device of a fifth embodiment of the present invention.

In the case of the guide device shown in FIG. 15, the rail 4 is snaking. However, for example, in the case where the rail 4 is annularly formed into an ellipse as shown in. FIG. 16, the seal device located outside the annular rail 4 is the seal device 30 composed as shown in FIG. 17, and the seal device located inside the annular rail 4 is the seal device 30 composed as shown in FIG. 18. The seal device 30 shown in FIG. 17 is composed in such a manner that the side 32-2a slidably coming into contact with the outer circumferential side face of the rail 4 is the straight seal member 32-2, the isolation plate is the isolation plate 33-1, and the side 32-3$a$ slidably coming into contact with the outer circumferential side face of the rail 4 is the seal member 32-3 of a concave (arc) of a predetermined radius of curvature. The seal device 30 shown in FIG. 18 is composed in such a manner that the side 32-2$a$ slidably coming into contact with the inner circumferential side face of the rail 4 is the straight seal member 32-2, the isolation plate is the isolation plate 33-1, and the side 32-1$a$ slidably coming into contact with the inner circumferential side face of the rail 4 is the seal member 32-1 of a convex (arc) of a predetermined radius of curvature.

As described above, the seal device 30 located outside the annular rail 4 is composed as shown in FIG. 17, and the seal device 30 located inside the annular rail 4 is composed as shown in FIG. 18. Due to the above structure, in the seal device 30 located outside, either the straight side 32-2$a$ of the seal member 32-2 or the concave (arcuate) side 32-3$a$ of the seal member 32-3 closely comes into contact with the outer circumferential side of the rail 4, so that the seal portion can be formed. In the seal device 30 located inside, either the straight side 32-2$a$ of the seal member 32-2 or the convex (arcuate) side 32-1$a$ of the seal member 32-1 closely comes into contact with the inner circumferential side of the rail 4, so that the seal portion can be formed. Accordingly, there is no possibility that foreign objects get into the slider 10 from the bottom side portion.

When the seal device 30 composed as shown in FIG. 4 is arranged at both end portions of the slider 10 of the guide device and when the seal device 30 composed as shown in FIG. 12 or the seal device 30 composed as shown in FIGS. 17 and 18 is arranged at both side portions of the bottom portion of the slider 10, it becomes possible to provide a guide device incorporated into a wood working machine used in a dusty environment in which both end portions and both side portions of the slider 10 are sealed so that no foreign objects can not get into the slider 10.

As explained above, according to each aspects of the present invention, it is possible to provide the following excellent effects.

According to the first aspect of the invention, a plurality of seal members are arranged in the casing so that the phase of arranging the plurality of seal members can be alternately changed in such a manner that when a seal portion of one seal member is pushed by the elastic member and contacted with one side of the rail, a seal portion of the next seal member is pushed by the elastic member and contacted with the other side of the rail. Accordingly, the seal portions of the plurality of seal members (at least two seal members) conduct sealing while they are sliding on the outer circumferential face of the rail on which the slider moves. Therefore, it is possible to provide a perfect sealing function. Especially when the rail width is locally different, for example even when the width of a curved portion is smaller than the width of a straight portion, a difference in the width can be absorbed when the seal member is moved while being pushed by the elastic member. Therefore, the seal portion can be always contacted with the outer circumferential face of the guide rail. Accordingly, the sealing function is not impaired.

According to the second aspect of the invention, when the elastic member is formed in the outside portion of the seal member integrally with the seal member as described above, the number of parts composing the seal device can be decreased, and the assembling work can be easily performed.

According to the third aspect of the invention, the isolation plate is arranged between the seal members. Therefore, each seal member can be smoothly moved according to the rail width without interfering with the other seal members by the action of the elastic member, and the seal portion comes into contact with the outer circumferential face of the guide rail. Therefore, the sealing function can be effectively performed.

According to the fourth aspect of the invention, the side of at least one seal member slidably coming into contact with the side of the rail is formed into a convex or concave of a predetermined radius of curvature, and the side of at least one seal member slidably coming into contact with the side of the rail is formed into the straight-line-shape. Therefore, in the straight portion of the rail, the straight side of the seal member closely comes into contact with the side of the rail, and in the curved portion of the seal member, the side of the seal member, which is formed into a convex or concave of a predetermined radius of curvature, closely comes into contact with the side of the rail, so that the seal portion can be formed. Therefore, even if the rail profile is changed from a straight shape to a curved shape, no foreign objects get into the slider from the side portion.

According to the fifth aspect of the invention, the side of at least one seal member slidably coming into contact with the side of the rail is formed into a convex of a predetermined radius of curvature, and the side of at least one seal member slidably coming into contact with the side of the rail is formed into a concave of a predetermined radius of curvature, and further the side of at least one seal member slidably coming into contact with the side of the rail is formed into a straight shape. Due to the above structure, in the straight rail portion, the straight side of the seal member closely comes into contact with the rail side, so that the seal portion can be formed. In the curved rail portion, the convex side of the seal member of a predetermined radius of curvature or the concave side of the seal member closely comes into contact with the rail side, so that the seal portion can be formed. In the portion where the rail is curved in the other direction, the concave side of the seal member of a predetermined radius of curvature or the convex side of the seal member closely comes into contact with the rail side, so that the seal portion can be formed. Therefore, even if the rail is curved from a straight shape to a curved shape which is curved to either the right or the left, no foreign objects gets into the slider from the side portion of the slider.

According to the sixth aspect of the invention, the elastic members are formed on the outside of the seal members integrally with the seal members. Therefore, the number of parts composing the seal device can be reduced, and the assembling work can be easily performed.

According to the seventh aspect of the invention, the isolation plate is arranged between the seal members. Therefore, each seal member is pushed by the elastic member and smoothly moved according to the curved rail without interfering with the other seal members, and the side of the seal member comes into contact with the rail side. Therefore, the sealing function can be effectively performed.

According to the eighth aspect of the invention, when the seal device attached to both end portions of the slider is the seal device according to one of the first to third aspects and the seal device attached to both side portions is the seal device according to the fourth to seventh aspects, both end portions and both side portions of the slider are sealed. Accordingly, it becomes possible to provide a guide device, into the slider of which no foreign objects get.

What is claimed is:

1. A seal device comprising:
   a casing;
   a plurality of plate-shaped seal members accommodated in the casing; and
   elastic members corresponding to each one of the seal members for pushing the seal members onto a rail,
   wherein a side of at least one seal member slidably coming into contact with a side of the rail is formed into a convex or concave shape of a predetermined radius of curvature, and a side of at least another seal member slidably coming into contact with the side of the rail is formed into a straight shape, and
   wherein the seal members are pushed by the elastic seal members, and at least one portion of the side of each seal member comes into contact with the side of the rail.

2. A seal device for a guide device according to claim 1, wherein the elastic members are integrally formed on the outer periphery of the seal members.

3. A seal device for a guide device according to claim 1, further comprising an isolation plate arranged between the seal members.

4. A seal device for a guide device according to claim 2, further comprising an isolation plate arranged between the seal members.

5. A seal device for a guide device according to claim 1, wherein the side of said at least one seal member slidably coming into contact with the side of the rail is formed into a convex shape of a predetermined radius of curvature.

6. A seal device for a guide device according to claim 1, wherein the side of said at least one seal member slidably coming into contact with the side of the rail is formed into a concave shape of a predetermined radius of curvature.

7. A guide device comprising:
   a slider arranged striding over the rail and the slider having seal devices arranged at both end portions and both side portions respectively for preventing foreign objects from getting into the slider;
   wherein the seal device attached to each side portion is the seal device described in claim 1, and;
   the rail is a straight and/or curved rail.

8. A seal device comprising:
   a casing;
   a plurality of plate-shaped seal members accommodated in the casing; and
   elastic members corresponding to each one of the seal members for pushing the seal members onto a rail,
   wherein a side of at least one first seal member slidably coming into contact with the side of the rail is formed into a convex shape of a predetermined radius of curvature, a side of at least one second seal member slidably coming into contact with the side of the rail is formed into a concave shape of a predetermined radius of curvature, and a side of at least one third seal member slidably coming into contact with the side of the rail is formed into a straight shape, and
   wherein the seal members are pushed by the elastic members and at least one portion of the side of each seal member comes into contact with the side of the rail.

9. A seal device for a guide device according to claim 8, wherein the elastic members are integrally formed on the outer periphery of the seal members.

10. A seal device for a guide device according to claim 8, further comprising an isolation plate arranged between the seal members.

11. A seal device for a guide device according to claim 9, further comprising an isolation plate arranged between the seal members.

12. A guide device comprising:
    a slider arranged striding over the rail and the slider having seal devices arranged at both end portions and both side portions respectively for preventing foreign objects from getting into the slider;
    wherein the seal device attached to each side portion is the seal device described in claim 8, and;
    the rail is a straight and/or curved rail.

* * * * *